United States Patent
Swan

(10) Patent No.: US 11,527,160 B2
(45) Date of Patent: Dec. 13, 2022

(54) SYSTEM AND METHOD FOR INTELLIGENT INFRASTRUCTURE CALIBRATION

(71) Applicant: Continental Automotive Systems Inc., Auburn Hills, MI (US)

(72) Inventor: Vivian Swan, Auburn Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 237 days.

(21) Appl. No.: 16/899,773

(22) Filed: Jun. 12, 2020

(65) Prior Publication Data

US 2021/0390859 A1  Dec. 16, 2021

(51) Int. Cl.
*G06K 9/00* (2022.01)
*G08G 1/16* (2006.01)
*H04W 4/44* (2018.01)
*G08G 1/01* (2006.01)
*G06V 20/13* (2022.01)

(52) U.S. Cl.
CPC .......... *G08G 1/166* (2013.01); *G06V 20/13* (2022.01); *G08G 1/0116* (2013.01); *H04W 4/44* (2018.02)

(58) Field of Classification Search
CPC .... G08G 1/166; G08G 1/0116; G08G 1/0141; G08G 1/04; G06V 20/13; H04W 4/44; G01S 7/4082; G01S 7/481; G01S 7/4972; G01S 13/42; G01S 13/87; G01S 13/91; G01S 17/931; G01S 7/4026; G01S 17/42; G01S 17/86; G02B 5/122; H01Q 15/18
See application file for complete search history.

(56) References Cited

U.S. PATENT DOCUMENTS

| | | | |
|---|---|---|---|
| 2009/0140887 A1* | 6/2009 | Breed | G01S 17/86 |
| | | | 701/116 |
| 2016/0343248 A1* | 11/2016 | Mende | G01S 13/91 |
| 2018/0170720 A1 | 6/2018 | Mannari | |
| 2020/0096604 A1* | 3/2020 | Okubo | G01B 11/002 |
| 2020/0158840 A1* | 5/2020 | Ikram | G01S 13/867 |
| 2020/0284887 A1* | 9/2020 | Wachter | G01S 17/86 |
| 2020/0290513 A1* | 9/2020 | Karafin | G03H 3/00 |

OTHER PUBLICATIONS

The International Search Report and the Written Opinion of the International Searching Authority dated Nov. 16, 2021 for the counterpart PCT Application No. PCT/US2021/070701.

* cited by examiner

*Primary Examiner* — Dhaval V Patel

(57) ABSTRACT

A system for infrastructure system calibration includes a sensor configured to be mounted to an infrastructure component and configured to detect an object. A corner reflector has an optical pattern and is arranged within a field of view of the sensor. The corner reflector has three surfaces that meet at a point.

7 Claims, 3 Drawing Sheets

SYSTEM AND METHOD FOR INTELLIGENT INFRASTRUCTURE CALIBRATION

BACKGROUND

Smart infrastructure systems may gather data regarding a particular environment, such as information regarding a number of pedestrians or vehicles detected in the particular environment. These infrastructure systems may include various types of sensors that are mounted to infrastructure (traffic lights, signs, parking meters, etc.) near intersections, along roads, and on buildings.

Infrastructure sensor systems may communicate with nearby vehicles. Vehicle to outside systems (V2X) communication, such as vehicle-to-vehicle (V2V) communication and vehicle-to-infrastructure (V2I) communication are-increasingly used as inputs to improve vehicle safety and convenience, particularly for driving-assistance systems and automated driving. Infrastructure sensing devices involved with V2X communication include sensing devices which sense objects within the field of view of the devices. Such a sensing device may, for example, be integrated with a traffic light or be a standalone object mounted on a pole, building or other structure. Despite infrastructure sensing devices being stably mounted and/or secured, the location of such devices may change over time. For example, the position (pitch, altitude and orientation) sensor may vary based upon temperature, wind, the weight of snow or ice on the sensor or the structure on which the traffic light is mounted, etc. In addition, vision based sensors need to be recalibrated from time to time.

SUMMARY

In one exemplary embodiment, a system for infrastructure system calibration includes a sensor configured to be mounted to an infrastructure component and configured to detect an object. A corner reflector has an optical pattern and is arranged within a field of view of the sensor. The corner reflector has three surfaces that meet at a point.

In a further embodiment of any of the above, the sensor is one of a radar sensor, a lidar sensor, and a camera.

In a further embodiment of any of the above, the system includes at least two sensors. The corner reflector is arranged in the field of view of the at least two sensors.

In a further embodiment of any of the above, the at least two sensors are different types of sensors selected from the group comprising a camera, a radar sensor, and a lidar sensor.

In a further embodiment of any of the above, a computing module is configured to be in communication with the sensor.

In a further embodiment of any of the above, the computing module is configured to communicate with a vehicle.

In a further embodiment of any of the above, the computing module is configured to be mounted on the infrastructure component.

In a further embodiment of any of the above, the computing module is configured to automatically update a position or orientation of the sensor with respect to the optical reflector periodically.

In a further embodiment of any of the above, the infrastructure component is near an intersection.

In a further embodiment of any of the above, the infrastructure component is one of a traffic light, a building, a street light, a sign, a parking meter, and a telephone pole.

In a further embodiment of any of the above, the object is a pedestrian or vehicle.

In another exemplary embodiment, a method of calibrating a sensor in an infrastructure system includes providing a sensor mounted to an infrastructure component. A corner reflector is provided that has an optical pattern. The corner reflector has three surfaces that meet at a point. The corner reflector is arranged within a field of view of the sensor. The corner reflector is detected with the sensor. An orientation of the sensor is stored with respect to the corner reflector.

In a further embodiment of any of the above, the orientation of the sensor is stored in a local coordinate system.

In a further embodiment of any of the above, the orientation of the sensor is stored in a global coordinate system.

In a further embodiment of any of the above, the detecting and storing steps are repeated periodically.

In a further embodiment of any of the above, the corner reflector is moved within an environment that contains the infrastructure component.

In a further embodiment of any of the above, a location of the corner reflector is tracked with a dGPS unit.

In a further embodiment of any of the above, the corner reflector is moved along areas of interest within the environment.

In a further embodiment of any of the above, the corner reflector is mounted near the infrastructure component.

In a further embodiment of any of the above, multiple sensors are provided. The corner reflector is within a field of view of each of the multiple sensors.

BRIEF DESCRIPTION OF THE DRAWINGS

The disclosure can be further understood by reference to the following detailed description when considered in connection with the accompanying drawings wherein.

DETAILED DESCRIPTION

The subject invention provides a system and method that includes mounting one or more optical corner reflectors to an infrastructure component within range of all sensors within the infrastructure environment. A method of calibrating the sensors includes detecting the optical reflector with the sensors, and determining a location and orientation of each sensor with respect to the optical reflector. Another example method of calibrating the sensors includes moving a calibration system throughout the infrastructure environment, and determining the location and orientation of the sensors relative to the calibration system. The calibration system includes a differential global positioning system (dGPS) and a corner reflector. This example may be used to map out features of the infrastructure environment, such as cross-walks and lane markers, for example.

Figure 1:
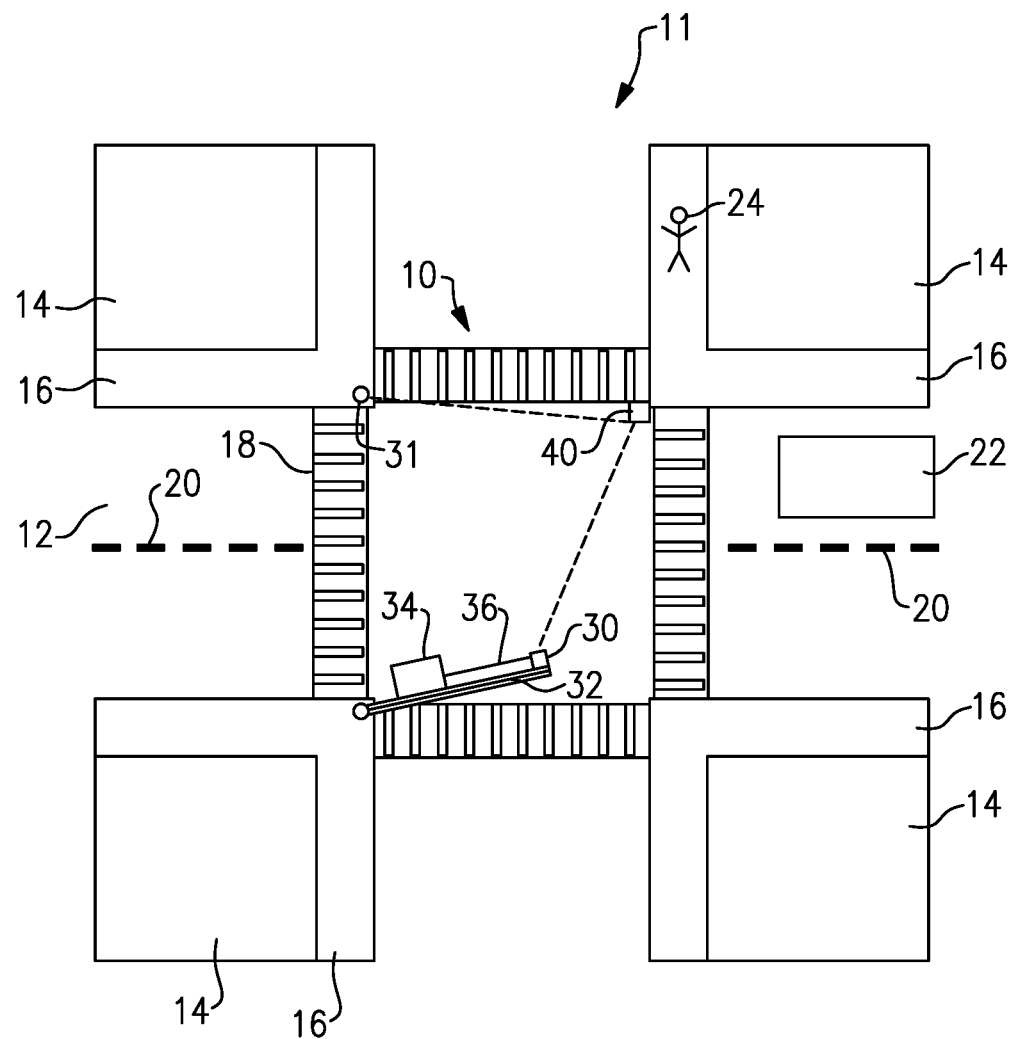
FIG. 1 schematically illustrates an example smart infrastructure system.

FIG. 1 illustrates an example smart infrastructure system 10 in an environment 11, such as an intersection. The environment 11 may contain roads 12, buildings 14, sidewalks 16, crosswalks 18, lane markers 20, vehicles 22, pedestrians 24, and street lights 32. Additional structures and/or objects may be present in the environment 11. The smart infrastructure system 10 may located in environments other than intersections, such as busy roads, mid-block crossings, or parking lots for example.

The system 10 generally includes a sensor 30 and a computing module 34 connected via communication hardware 36. In the illustrated example, the sensor 30 is mounted on a traffic light 32. In other examples, the sensor 30 may be mounted on a building 14, a street light, a sign, a parking meter, a telephone pole, or other structure in an area. The sensor 30 is statically mounted within the environment 11. In some examples, a second sensor 31 may be mounted within the system 10. Although two sensors 30, 31 are shown, additional sensors may be mounted across multiple structures. The system 10 may include multiple sensors 30 mounted on the same or different structures, each of the sensors 30 in communication with the computing module 34. Although communication hardware 36 is illustrated, the sensor 30 and computing module 34 may communicate wirelessly.

The sensor 30 detects and tracks objects within the environment 11. The object may be a pedestrian 24 or vehicle 22, for example. The sensor 30 may be a camera, a radar sensor, or a lidar sensor, for example. The sensor 31 may be a different type of sensor from the sensor 30. The sensor 30 communicates the location of the objects in the environment 11 to the computing module 34. Each of the sensors 30, 31 within the environment 11 may communicate with a single computing module 34, or several computing modules 34 may be arranged within the system 10 for communication with different sensors 30, 31. The computing module 34 may then send information regarding detected objects within the environment 11, such as pedestrians 24 or vehicles 22, to nearby vehicles via V2X communication. This information may be particularly useful for autonomous or semi-autonomous vehicles. The vehicle can receive information about a particular environment 11 from the system 10 earlier than it would otherwise be able to detect. The sensors 30, 31 need to be accurate in order to send accurate information to the computing module 34 and on to autonomous vehicles. Thus, the system 10 should be periodically calibrated to account for any shift in orientation and/or position of the sensors 30, 31. An optical reflector 40 and methods for calibrating the system 10 are described further below.

An optical reflector 40 is arranged within the system 10. The optical reflector 40 is within a field of view of the sensors 30, 31 in the system 10. In one example, the optical reflector 40 is placed within the environment 11 such that it is viewable by all sensors in the system 10. In another embodiment, more than one reflector 40 may be used such that all sensors in the system 10 can see a reflector 40.

Figure 2:
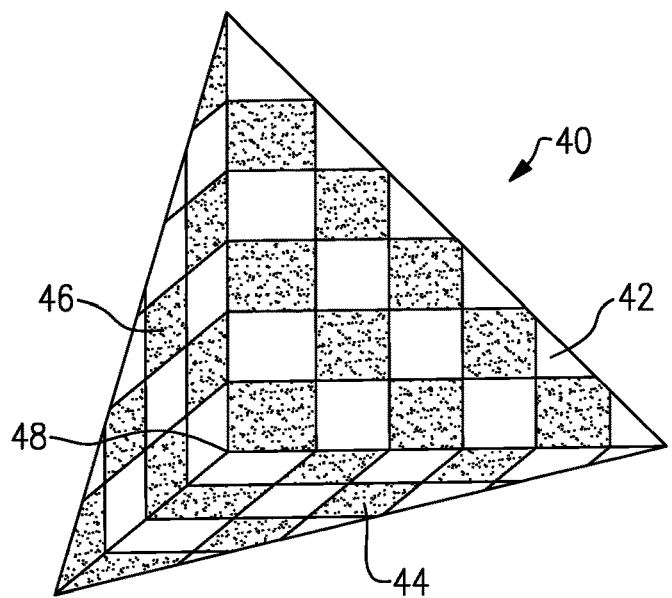
FIG. 2 illustrates an example corner reflector according to an embodiment.

With reference to FIG. 2, and continuing reference to FIG. 1, the optical reflector 40 is a radar corner reflector with unique optical pattern for image recognition. The reflector 40 includes first, second, and third sides 42, 44, 46 that meet at a point 48. Each of the sides 42, 44, 46 may have an optical pattern. In the illustrated example, the sides 42, 44, 46 each have a checkerboard pattern. However, other optical patterns may fall within the scope of this disclosure. Further, the sides 42, 44, 46 may have different patterns from one another. The unique corner shape of the reflector 40 allows a sensor 30 to determine the precise location of the reflector 40.

The reflector 40 is statically mounted within the infrastructure system 10. The reflector 40 should be mounted in a location that is within a field of view of as many sensors as possible in the system 10. In one example, the reflector 40 is mounted within a field of view as all sensors in the system 10. In other examples, more than one reflector 40 may be used such that as many sensors as possible can detect a reflector 40. The position of the reflector 40 may be programmed into the computing module 34. The sensor 30 detects the location of the reflector 40, and determines the position and/or orientation of the sensor 30 relative to the reflector 40. The sensor 30 may repeatedly detect the location of the reflector 40 and update the position and/or orientation. The position and orientation of the sensor 30 are stored in the computing module 34, and used to determine information about the position of any objects detected by the sensor 30. The sensor position 30 may be stored in a local coordinate system relative to the environment 11 and a known global position, or converted into a global coordinate system. The position and orientation of the sensor 30 is stored in coordinates capable of being received and understood by a V2X enabled vehicle, for example. The orientation of the sensor 30 may be calibrated in degrees from north, for example. The repeated calibration of the sensor 30 ensures that if the sensor 30 moves, such as the sensor 30 is disturbed by high winds or birds, for example, the position and orientation of the sensor 30 remain up to date.

The computing module 34 may be calibrated to have data regarding the surrounding environment 11. For example, the computing module 34 may be calibrated to have information regarding cross walks 18, buildings 14, sidewalks 16, roads 12, lane markers 20, or other features within the environment 11. The sensors 30, 31 may communicate with the computing module 34 via communication hardware 36, or may communicate wirelessly. The system 10 may use one or more of the following connection classes, for example: WLAN connection, e.g. based on IEEE 802.11, ISM (Industrial, Scientific, Medical Band) connection, Bluetooth® connection, ZigBee connection, UWB (ultrawide band) connection, WiMax® (Worldwide Interoperability for Microwave Access) connection, infrared connection, mobile radio connection, and/or radar-based communication.

The system 10, and in particular the computing module 34, may include one or more controllers comprising a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The computing module 34 may include a hardware device for executing software, particularly software stored in memory, such as an algorithm for sensor calibration. The computing module 34 may include a custom made or commercially available processor, a central processing unit (CPU), an auxiliary processor among several processors associated with the computing module 34, a semiconductor based microprocessor (in the form of a microchip or chip set), or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The controller can be configured to execute software stored within the memory, to communicate data to and from the memory, and to generally control operations of the computing module 34 pursuant to the software. Software in memory, in whole or in part, is read by the processor, perhaps buffered within the processor, and then executed. This software may be used to determine and store the sensor orientation and position in the environment, for example.

Figure 3:
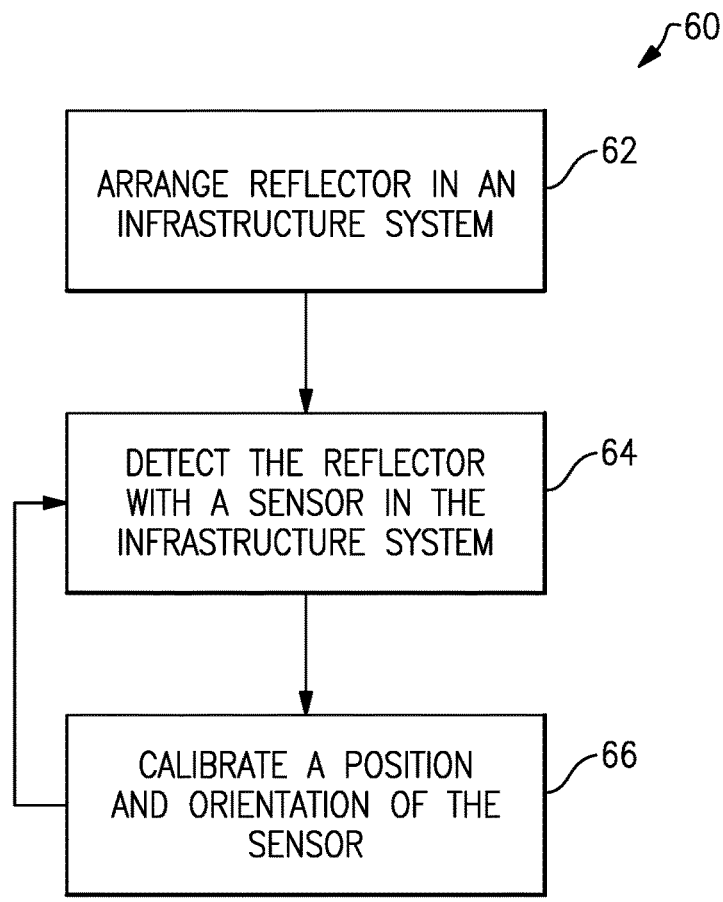
FIG. 3 illustrates an example method of calibrating a smart infrastructure system.

FIG. 3 summarizes an example method 60 of calibrating the system 10. An optical reflector 40 is statically mounted within an infrastructure system 10 at 62. The optical reflector 40 may be a corner optical reflector, and is mounted within a field of view of at least one sensor 30. The sensor 30 detects the optical reflector 40 at 64. The sensor 30 is able to determine the precise location of the sensor relative to a known location of the optical reflector 40 because of the unique shape and pattern on the optical reflector 40. Based on the detected position of the sensor 30 relative to the reflector 40, the position and orientation of the sensor 30 is calibrated at 66. The calibrated position and orientation of the sensor 30 may be sent to the computing module 34, for example. The position and orientation of the sensor 30 may be stored in the computing module 34. The position and orientation of the sensor 30 may be stored in a local coordinate system or a global coordinate system. Steps 64 and 66 are repeated to maintain an accurate position and orientation of the sensor 30 within the system 10. Steps 64 and 66 may be repeated every sensor cycle, or less frequently. For example, if the sensor 30 is a radar sensor, the sensor cycle may be about 30 milliseconds. In other examples, the steps 64, 66 are repeated less frequently. The system 10 may be configured to automatically perform the method 60 to calibrate the sensor position and orientation.

Figure 4:
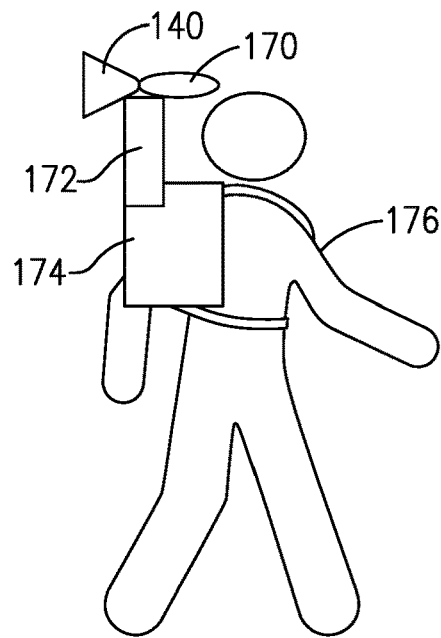
FIG. 4 illustrates another example calibration system with a corner reflector.

FIG. 4 schematically illustrates another example reflector system. In this embodiment, a corner reflector 140 is movable throughout the environment 11. The corner reflector 140 may be mounted to a backpack 174 worn by an operator 176, for example. The backpack 174 also includes a differential global positioning system (dGPS) unit 172 and a dGPS antenna 170. With this system, the operator 176 may walk through the environment 11 and the sensors 30, 31 detect the corner reflector 140. This system may be used to calibrate the location of features within the environment 11, for example. In one example, the operator 176 walks through the environment 11 along features, such as cross walks 18, sidewalks 16, and lane lines 20. The sensors 30, 31 can then detect and store information regarding the locations of these features relative to the sensor 30, 31. Although the corner reflector 140, dGPS antenna 170, and dGPS unit 172 are illustrated on a backpack, other example arrangements may be contemplated within the scope of this disclosure. For example, the corner reflector 140, dGPS antenna 170, and dGPS unit 172 may be mounted on a vehicle or cart.

This example enables calibration to a large number of points within the environment 11, as opposed to a single point. Using a large number of points may improve the accuracy of calibration of the sensors 30, 31. This system also does not require any optical reflectors to be mounted to the infrastructure, which may be desirable in some environments 11.

Figure 5:
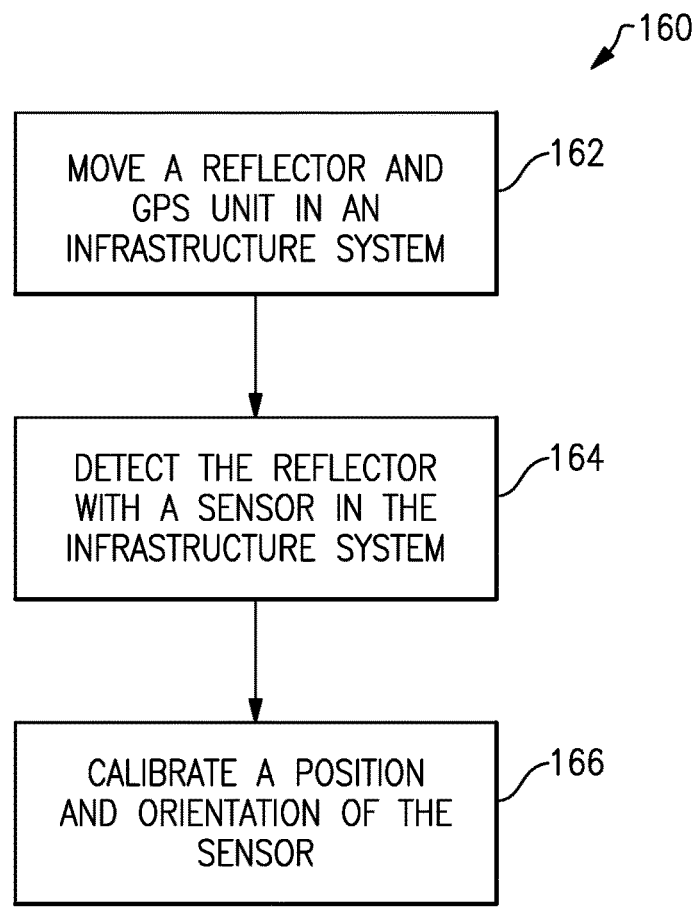
FIG. 5 illustrates an example method of calibrating a smart infrastructure system using the system of FIG. 4.

FIG. 5 summarizes an example method 160 of calibrating a smart infrastructure system using the system of FIG. 4. In this example, a reflector 140 and dGPS unit 172 are moved within an environment 11 having a smart infrastructure system 10 at 162. At least one sensor 30 is mounted in the system 10 and in communication with a computing module 34. As the reflector 140 and dGPS unit 172 are moving within the environment 11, the sensor 30 detects the reflector 140 at 164. The dGPS unit 172 unit provides an exact location of the reflector 140 as they are moving within the environment 11, and the sensor 30 calibrates its position and orientation with respect to the reflector location at 166. In some examples, the reflector 140 and dGPS unit 172 are moved along key points within the environment 11, such as cross walks 18 and lane markers 20. This method 160 may be used to map out the environment 11 for a newly installed infrastructure system 10 or recently changed environment 11, for example. This method 160 may also be used periodically to recalibrate the sensors 30 in the system 10. The data collected by the dGPS unit 172 may be synced with the computing module 34 in real time, or may be stored and transferred after steps 162 and 164.

Known systems may require multiple reflectors for a single sensor to accurately determine a position and orientation. As discussed above, the system 10 uses a corner optical reflectors 40 to calibrate the sensor position. The example corner optical reflectors 40, 140 have three surfaces that meet at a point. This arrangement allows the sensor to pinpoint the exact location of the optical reflector accurately. This is beneficial over known smart infrastructure systems because a single reflector may be used to accurately calibrate one or more sensors.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A system for calibration of an infrastructure system, comprising:
   a corner reflector having an optical pattern and statically mounted within the infrastructure system, the corner reflector having three surfaces that meet at a point a first sensor mounted to a first infrastructure component disposed at a first position, the first sensor configured to detect vehicles, pedestrians, and the corner reflector;

a second sensor mounted to a second infrastructure component disposed at a second position, the second sensor configured to detect vehicles, pedestrians, and the corner reflector; and computing module in communication with the first sensor and the second sensor, the computing module configured to calibrate a first position of the first sensor relative to the corner reflector based on the first sensor detecting the corner reflector and a static position of the corner reflector, calibrate a second position of the second sensor relative to the corner reflector based on the second sensor detecting the corner reflector and the static position of the corner reflector, and determine a third position of a vehicle or pedestrian detected by the first sensor and the second sensor based on the first position and the second position, wherein the first infrastructure component and the second infrastructure component comprise one of a traffic light, a building, a street light, a sign, a parking meter, and a telephone pole.

2. The system of claim 1, wherein the first sensor and the second sensor comprise one of a radar sensor, a lidar sensor, and a camera.

3. The system of claim 2, wherein the first sensor and the second sensor are different types of sensors selected from the group comprising a camera, a radar sensor, and a lidar sensor.

4. The system of claim 1, wherein the computing module is configured to communicate the third position of the vehicle or the pedestrian with another vehicle.

5. The system of claim 1, wherein the computing module is mounted on at least one of the first infrastructure component, the second infrastructure component, and a third infrastructure component disposed at a position different from the first position and the second position.

6. The system of claim 1, wherein the computing module is configured to periodically calibrate the first position of the first sensor and the second position of the second sensor.

7. The system of claim 1, wherein the infrastructure system comprises an intersection control system.

\* \* \* \* \*